(12) United States Patent
Haikin et al.

(10) Patent No.: US 7,342,682 B2
(45) Date of Patent: Mar. 11, 2008

(54) INCREMENTAL COLOR TRANSFORM CREATION

(75) Inventors: John S. Haikin, Fremont, CA (US); Todd D. Newman, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1029 days.

(21) Appl. No.: 10/309,880

(22) Filed: Dec. 5, 2002

(65) Prior Publication Data

US 2004/0109179 A1    Jun. 10, 2004

(51) Int. Cl.
- G06F 15/00    (2006.01)
- G03F 3/08    (2006.01)
- G06K 9/00    (2006.01)

(52) U.S. Cl. .................. 358/1.9; 358/518; 382/167
(58) Field of Classification Search ............... 358/1.9, 358/518, 523, 529, 530, 524, 501; 382/167, 382/162
See application file for complete search history.

(56) References Cited

U.S. PATENT DOCUMENTS

| | | | | |
|---|---|---|---|---|
| 4,731,662 A | | 3/1988 | Udagawa et al. ............ 358/75 |
| 5,208,911 A | | 5/1993 | Newman et al. ............ 395/162 |
| 5,432,906 A | | 7/1995 | Newman et al. ............ 395/162 |
| 5,463,480 A | | 10/1995 | MacDonald et al. ........ 358/520 |
| 5,572,632 A | * | 11/1996 | Laumeyer et al. ......... 358/1.17 |
| 5,594,558 A | | 1/1997 | Usami et al. ............... 358/518 |
| 5,606,432 A | * | 2/1997 | Ohtsuka et al. ............ 358/527 |
| 5,657,068 A | | 8/1997 | Ohta .......................... 347/232 |
| 5,712,925 A | | 1/1998 | Ohga .......................... 382/167 |
| 5,748,858 A | * | 5/1998 | Ohtsuka et al. ............. 358/1.9 |
| 5,786,823 A | | 7/1998 | Madden et al. ............. 345/431 |
| 5,949,967 A | * | 9/1999 | Spaulding et al. ........... 358/1.9 |
| 6,023,527 A | * | 2/2000 | Narahara .................... 382/167 |
| 6,041,136 A | * | 3/2000 | Ohga ........................ 382/162 |
| 6,075,888 A | * | 6/2000 | Schwartz .................... 382/167 |
| 6,362,808 B1 | * | 3/2002 | Edge et al. ................. 345/601 |
| 6,603,483 B1 | * | 8/2003 | Newman .................... 345/593 |
| 6,704,442 B2 | * | 3/2004 | Haikin et al. .............. 382/162 |
| 6,922,266 B2 | * | 7/2005 | Hiramatsu .................. 358/518 |
| 7,088,373 B2 | * | 8/2006 | Asano ........................ 345/600 |
| 7,106,474 B1 | * | 9/2006 | Haikin et al. ............... 358/1.9 |
| 7,129,958 B2 | * | 10/2006 | Newman et al. ........... 345/604 |
| 2001/0053247 A1 | * | 12/2001 | Sowinski et al. ........... 382/162 |
| 2005/0174591 A1 | * | 8/2005 | Sowinski et al. ........... 358/1.9 |
| 2006/0018536 A1 | * | 1/2006 | Haikin et al. .............. 382/167 |

FOREIGN PATENT DOCUMENTS

| | | |
|---|---|---|
| EP | 763801 | 3/1997 |
| EP | 1102478 | 5/2001 |
| WO | 92/20184 | 11/1992 |
| WO | 02/21440 | 3/2002 |

* cited by examiner

Primary Examiner—Madeleine A V Nguyen
(74) Attorney, Agent, or Firm—Fitzpatrick, Cella, Harper & Scinto (57) ABSTRACT

An overall color transformation is constructed from multiple ones of individual color transformation steps, the overall color transformation used by a color management system to transform colors from one color space to another. A sequence of sequential add operations is executed, each add operation adding a single one of the individual transformation steps to an intermediate transformation constructed from preceding add operations, and for each add operation returning at least one value which characterizes the add operation. The sequence of subsequent add operations is altered based on preceding ones the returned values.

13 Claims, 6 Drawing Sheets

INCREMENTAL COLOR TRANSFORM CREATION

BACKGROUND OF THE INVENTION

1. Field of the Invention

The present invention relates to computer-implemented creation of a transformation for transforming colors in a color management system, and particularly to a method and apparatus for creating an overall transformation, wherein the overall transformation is created using a sequence of add operations, each of which adds an individual transformation step and returns information which is used to decide on a transformation step to add in a subsequent add operation.

2. Description of the Related Art

Using a color management system, a color image is processed by a transformation to transform colors in the image from one color space (e.g., RGB, CMYK, CIELab, etc.) to another color space. Typically, a transformation used by the color management system is used with one or more color devices and takes into account the characteristics of each of the devices.

One such characteristic associated with a device is the gamut of colors that the color device can reproduce. Transformation of color image data into a device's color space typically entails the use of a gamut mapping algorithm (GMA) that maps the colors of an image to the gamut of colors of a color device. In addition to transforming the colors of a device's gamut of colors, the color management system (CMS) usually transforms the colors between a device's color space and a device-independent color space. The transformation that transforms colors according to device color space(s) and gamut(s) is ordinarily given in the form of mathematical expressions or as one or more look-up tables.

Figure 1:
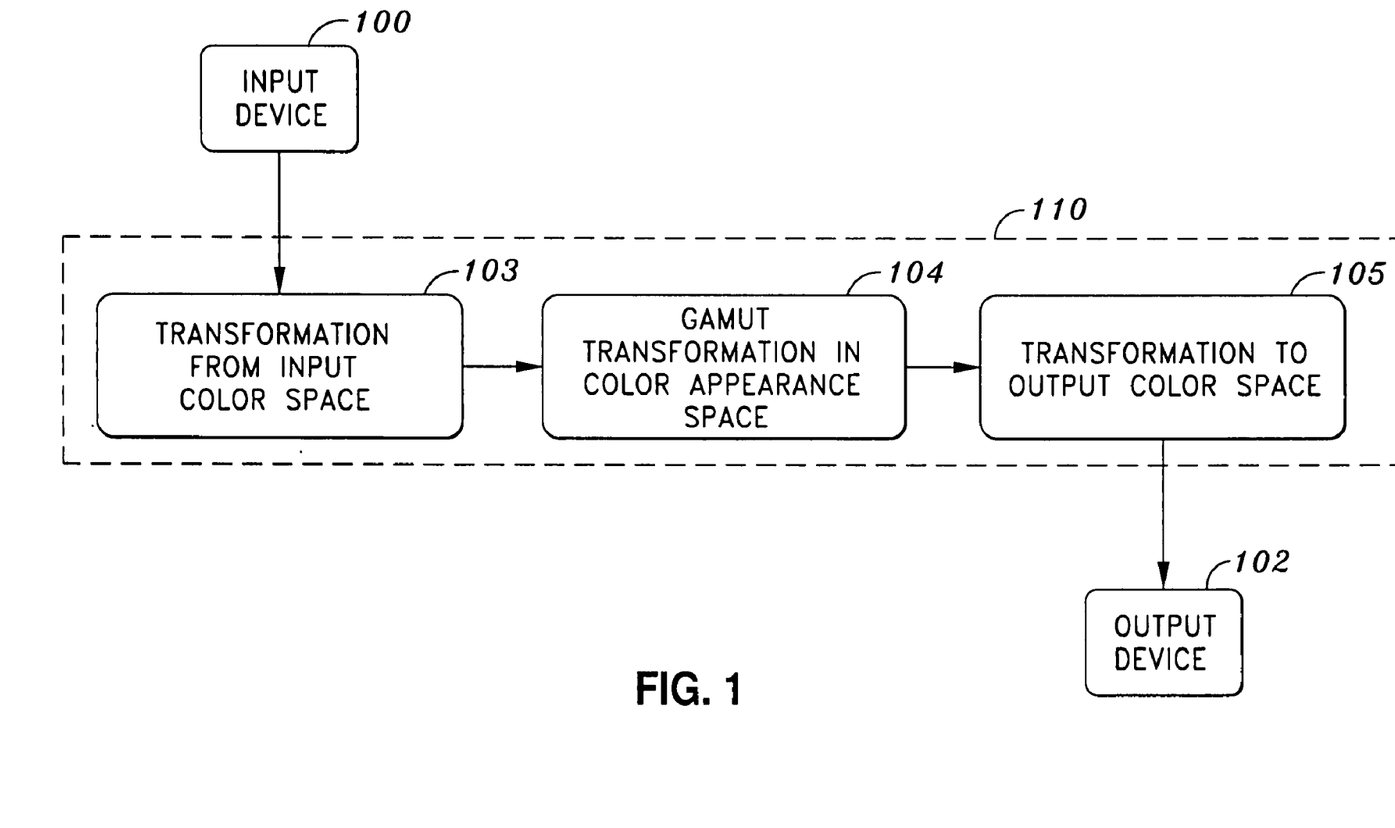
FIG. 1 illustrates a processing pipeline used by a color management system to transform color image data between color spaces and gamuts.

FIG. 1 illustrates processing in a color management system to transform color image data between color spaces and gamuts using a transformation made up of several steps.

Input device 100 may be, for example, a color scanner which uses the RGB (Red, Green and Blue) device color space. In the example, output device 102, which may be a color printer, uses a different device color space such as the CMYK (Cyan, Magenta, Yellow and Black) device color space. Image data generated by input device 100 using the RGB device color space must be converted to the CMYK device color space for use by output device 102. In addition, those colors in the image data that are not able to be represented in the gamut of colors of output device 102 must be converted to the gamut of output device 102.

Blocks 103 to 105 illustrate a transformation, transformation 110, which includes color space and gamut transformation steps. In each transformation step, color data input to the step is converted to color data output using a transformation. In block 103, the color data received from input device 100 is converted to a color appearance space, such as CIECAM97s, or a device-independent color space, such as CIELab. In block 104, the color data input (e.g., CIECAM97 or CIELab color data) is converted, or gamut mapped, from the gamut of input device 100 to the gamut of output device 102 using a GMA. Thereafter, the color data is converted from color appearance space to the color space of output device 102. Output device 102 can then generate output using the color data.

Transformation 110 is typically defined using device profiles for both the input and output devices. A device profile defines the characteristics of the device. One type of device profile, which is typically referred to as an ICC (International Color Consortium) profile, provides a transformation step in the form of a look-up table that can be used to transform a color image from the device's device-dependent color space to a device-independent color space.

Another type of device profile is a measurement only profile (MOP), which contains measurement data for a given device. The measurement data provides a mapping of a device's color definition in device-dependent color space of a sampling of colors to color measurements of the color samples taken, the color measurements taken in device-independent color space using a measurement device (e.g., a spectrophotometer or colorimeter). The measurement data may be further defined by viewing conditions (e.g., lighting) in which the measurement data was generated. In this regard, commonly-owned U.S. patent application Ser. No. 09/540,012, filed Mar. 31, 2000, entitled "Color Management System Using Measured Device Data", by John S. Haikin, et al., which provides a CMS that uses measurement data and viewing condition data to construct a color transformation to transform a source color image into a destination device color space, is incorporated herein by reference.

In a conventional color management system, a "create transform" program module is used to produce color transformation 110. The "create transform" module takes as input a list of color profiles, (e.g., input and output device profiles), together with any other information needed to create the transform, such as a rendering intent or GMA, a device characterization module and the like. The "create transform" module receives the input and outputs a transform using the parameters provided. A problem with this approach is that there is little visibility into the creation process performed by the program module. The "create transform" program module may return a status that reflects the overall outcome of the create process as a whole. However, the overall status information that is provided is not helpful in determining a problem with a specific portion of the create process performed by the module.

Therefore, it would be beneficial to have a transform creation process which creates a transformation using separate steps so that information can be gathered about each step, which can be used to determine subsequent steps in the transformation creation process.

SUMMARY OF THE INVENTION

It is an object of the present invention to address the foregoing difficulties and drawbacks in the prior art, by providing a method and apparatus for building an overall color transformation constructed from individual color transformation steps, each of which are added in a separate add operation. The add operation returns a value which characterizes the add operation. Based on preceding ones of the returned values, the sequence of subsequent add operations is altered.

Since each add operation adds an individual transformation step and returns information characterizing the add operation, the returned value provides information specific to a given add step which can then be used to alter the sequence of subsequent add operations used to construct the overall transformation.

According to the present invention, a method is defined of creating an overall color transformation from multiple ones of individual color transformation steps, the overall color transformation for use by a color management system to transform colors from one color space to another. A sequence of sequential add operations is executed, each add operation adding a single one of the individual transformation steps to an intermediate transformation constructed from preceding add operations, and for each add operation returning at least one value which characterizes the add operation. A test is performed to determine whether to alter the sequence of subsequent add operations, and based on preceding ones of the returned values, the sequence of subsequent add operations can be altered.

In another aspect of the invention, a method is defined of creating an overall color transformation from multiple ones of individual color transformation steps, the overall color transformation for use by a color management system to transform colors from one color space to another. A program module is executed to add a first one of the individual color transformation steps to an intermediate color transformation, the program module returning a value characteristic of the added transformation step. The program module is then executed to add a second one of the individual color transformation steps, the second one being selected from the multiple individual color transformation steps based on the value returned by the first add.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 2:
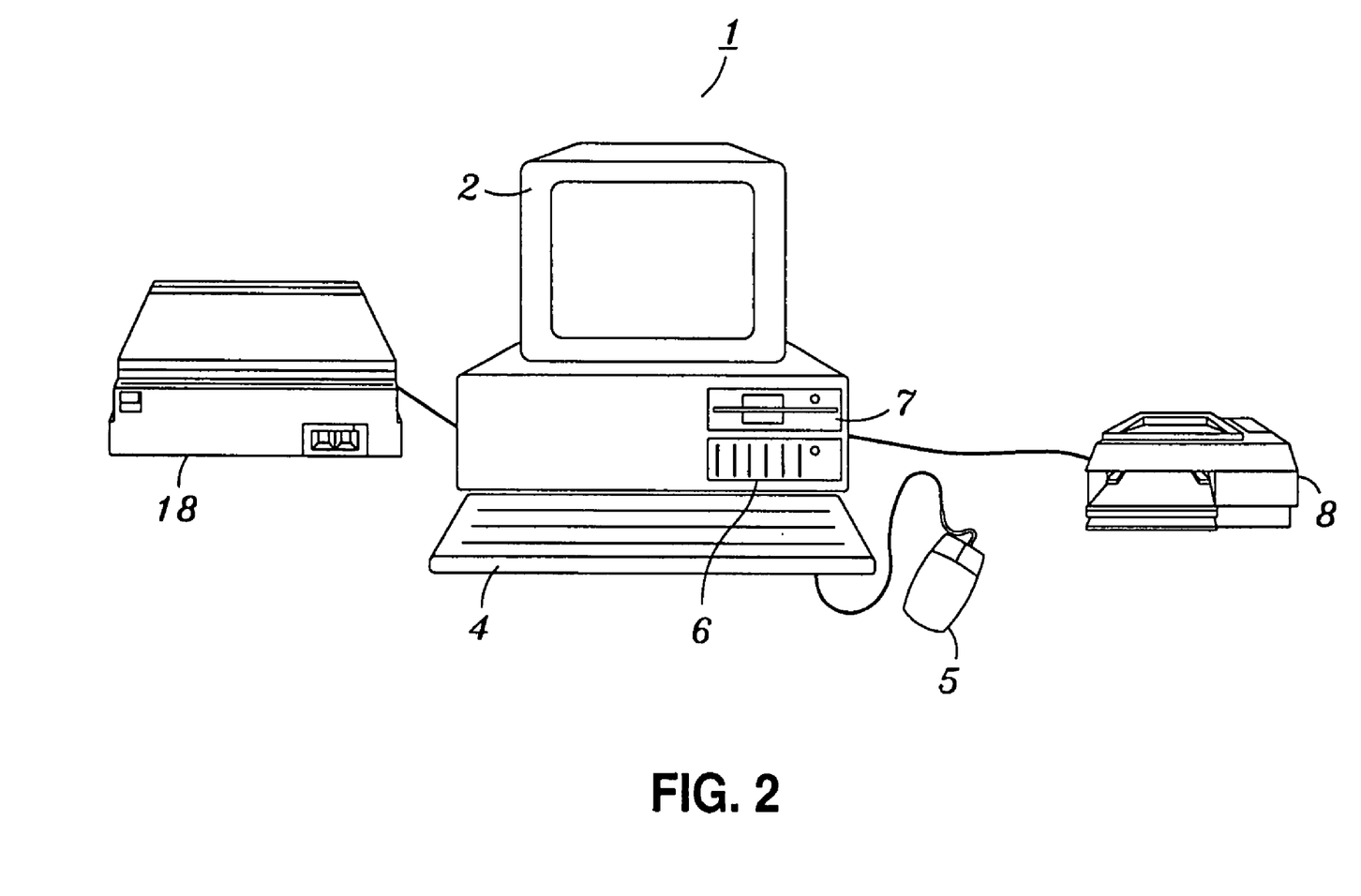
FIG. 2 is an outward view of a hardware environment embodying the present invention.

FIG. 2 is an outward view of representative computing hardware embodying the present invention. Shown in FIG. 2 are computer 1 executing a browser-enabled operating system, such as Microsoft Windows® XP, display monitor 2 for displaying text and images to a user, keyboard 4 for entering text and commands into computer 1, and mouse 5 for manipulating and for selecting objects displayed on display monitor 2. Also included with computer 1 are fixed disk drive 6, in which are stored application programs, such as a color management system application, data files, and device drivers for controlling peripheral devices attached to computer 1, floppy disk drive 7 for use in reading data from and writing data to floppy disks inserted therein. Data and/or applications may also be accessed from a CD-ROM via a CD-ROM drive (not shown) or over a network to which computer 1 may be connected (network connection not shown).

Scanner 18 is an example of an input device, and monitor 2 and printer 8 are examples of output devices. Other examples of devices not shown in FIG. 2 include a digital camera (e.g., still or video), offset press, digital projector, etc. In addition, it should be apparent that the present invention is not limited to these devices.

Figure 3:
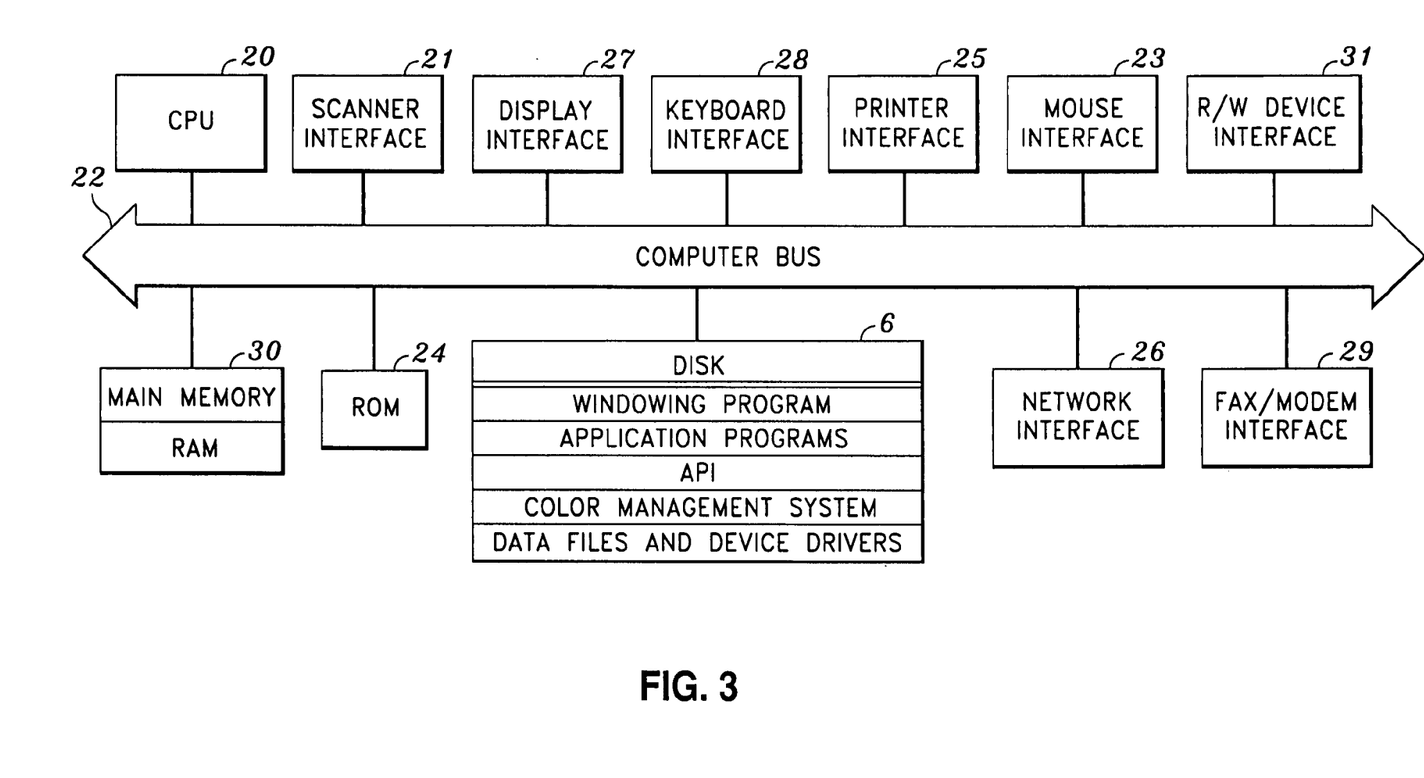
FIG. 3 is a block diagram of the internal architecture of a personal computer for use in conjunction with the present invention.

FIG. 3 is a block diagram of the internal architecture of computer 1. Shown in FIG. 3 are CPU 20, which is preferably a microprocessor such as a Pentium-type microprocessor, interfaced to computer bus 22. Also interfaced to computer bus 22 are printer interface 25, to allow computer 1 to communicate with printer 8, modem interface 26 to enable communications between computer 1 and its internal modem, display interface 27 for interfacing with display monitor 2, keyboard interface 28 for interfacing with keyboard 4, and mouse interface 29 for interfacing with mouse 5.

Read only memory (ROM) 31 stores invariant computer-executable process steps for basic system functions such as basic I/O, start up, or reception of keystrokes from keyboard 4.

Main random access memory (RAM) 32 provides CPU 20 with memory storage which can be accessed quickly. In this regard, computer-executable process steps (or program module or program code) are transferred from disk 6 over computer bus 22 to RAM 32 and executed therefrom by CPU 20.

Also shown in FIG. 3 is disk 6 which, as described above, includes a windowing operating system, a color management system executable on the particular windowing operating system, an application program to control the creation of an overall color transformation, an application programming interface (API) called by the application program to add individual transformation and to complete the overall transformation. Other application programs may include word processing, spreadsheet, graphics, and the like. Disk 6 further includes data files and device drivers as shown.

While other computing systems may be used with the present invention, FIGS. 2 and 3 provide an exemplary representation of a computing system which can be used to create an overall color transformation from multiple ones of individual color transformation steps according to embodiments of the present invention. The overall color transformation may then be used by a color management system to transform colors from one color space to another. In each add operation in a sequence of sequential add operations, an individual transformation step is added to an intermediate transformation created from preceding add operations. From each add operation, information that characterizes the add operation is returned. For example, information that characterizes the current state of the intermediate transformation may be returned, and may include an indication of whether the data used in the add operation was valid, or may be incompatible, in some manner, with the intermediate transformation which existed prior to the add operation. In addition, some or all of the data used in the add operation to add to the intermediate transformation may be returned. These and other examples of returned values will be discussed more fully below. The returned information from preceding ones of the add operations can then be tested to determine whether to alter the sequence of subsequent add operations.

Figure 4:
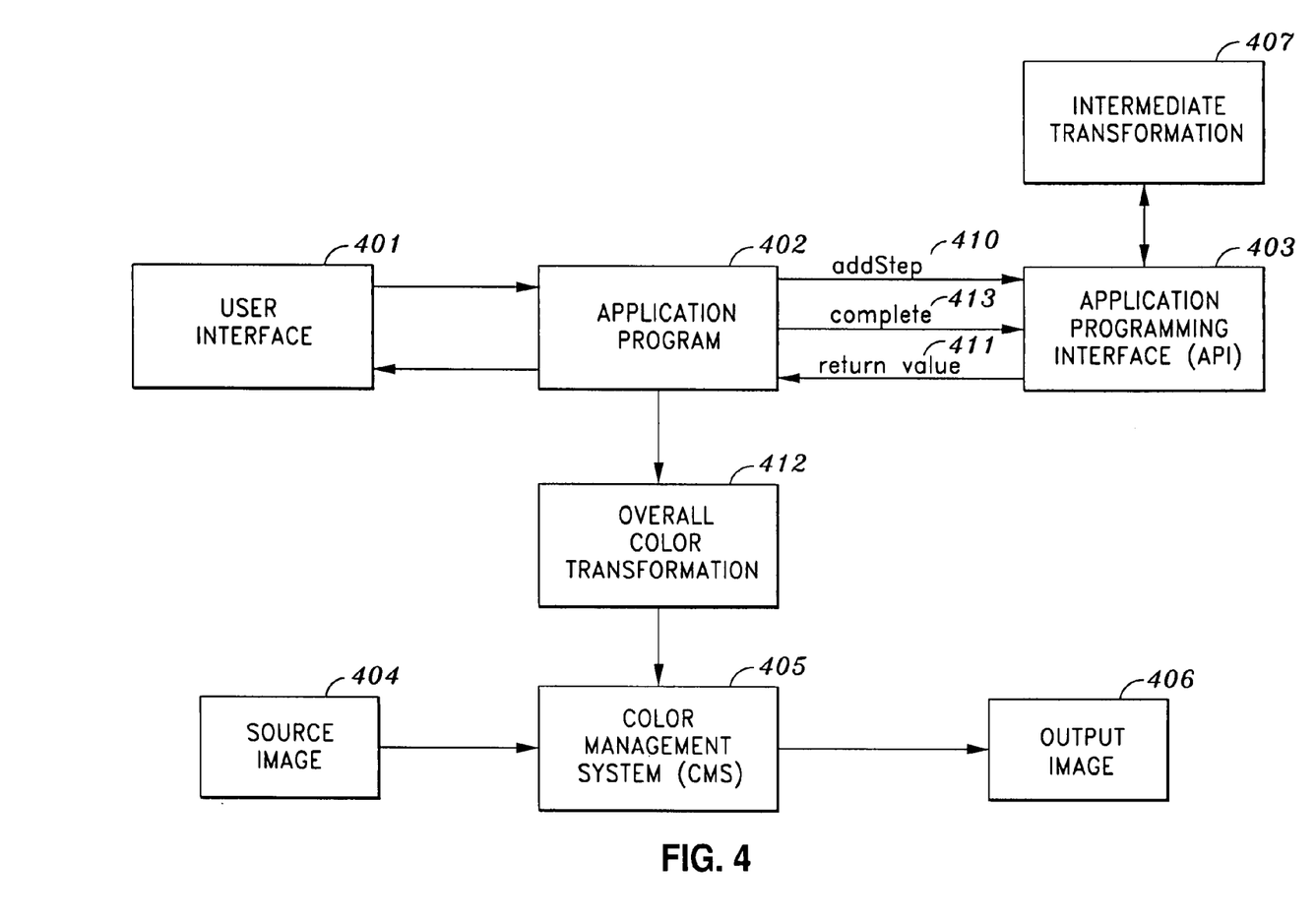
FIG. 4 provides a diagrammatical overview of transformation creation according to the present invention.

FIG. 4 provides a diagrammatical overview of transformation creation according to the present invention.

Preferably, an application program interface (API) 403 is used which comprises program modules executable to add an individual transformation to intermediate transformation 407, and to complete the transformation and output an overall transformation. Application 402 accesses API 403 to invoke the particular program modules of API 403 to perform the add operation steps needed to create the overall transform. Once all of the individual transformation steps have been added, application 402 invokes API 403 to complete the transformation creation process.

In the example of FIG. 4, application 402 invokes a program module of API 403 to execute an add operation using a call, i.e., "addStep" 410, to the program module and supplies any needed input as part of the invocation. In an add operation to add a transformation step based on a color device's device profile, application 402 supplies the profile name to addStep 410.

The addStep 410 program module executes to add an individual transformation to intermediate transformation 407. Preferably, intermediate transformation 407 is created as a result of the first instance of addStep 410, which adds the first individual transformation step. Information characterizing the add operation (e.g., the state of intermediate transform 407), return information 411, is then returned to application program 402 by the addStep 410 module of API 403. Return information 411 can comprise one or more return values.

As is discussed more fully below, returned information can comprise information supplied with addStep 410 (e.g., some portion of the device profile, information generated during the add operation, or both). Information returned from a preceding add operation can be supplied with a subsequent addStep 410. In addition, an error condition or warning message can be included in the returned information.

It should be understood that information may be passed to and from API 403 according to any known programming technique. For example, an object-oriented object can be used to encapsulate the information, and the information is then retrievable using methods of the object. In addition, it should be apparent that API 403 may be implemented using any programming language including object-oriented and procedurally-oriented programming languages.

A program module of API 403 is executed to complete the overall transform. For example, "complete" 413 invokes a program module of API 403 that verifies the overall transformation, and provides return information 411, which characterizes the complete operation. For example, return information 411 from a complete transform operation can indicate whether or not the overall transformation is valid.

Examples of information that becomes input to an add operation include a name of a device profile (e.g., input device profile, monitor profile, or output device profile) and a gamut mapping algorithm. As is discussed in more detail below, information output by one add operation can become input to a subsequent add operation, one such example, is undercolor removal and black generation information.

Return information 411 provided from one or more add operations is examined or tested to determine whether or not to alter the sequence of subsequent add operations. Application 402 can test information to determine whether or not to alter the sequence of subsequent add operations. In addition or as an alternative, a user can be consulted using user interface (UI) 401 to determine whether or not to alter the sequence of subsequent add operations. Thus, changes to the add operation sequence can be determined programmatically by application 402, or based on user input to application 402 via UI 401, or both.

As is discussed more fully below, an add operation sequence can be altered by adding, removing, replacing an add operation in the operation sequence. In addition, an add operation can be modified by changing the information supplied with an addStep 410. One such example, which is discussed below, is supplying undercolor removal (UCR) and black generation information to an add operation.

Once an overall color transformation (e.g., color transformation 412) has been created using API 403, it is provided to CMS 405, which uses color transformation 412 to transform source image 404 to output image 406.

In the illustration of FIG. 4, application 402 is depicted separate from CMS 405. However, it should be apparent that application 402 can be a part of CMS 405. Similarly, CMS 405 may include API 403.

Figure 5:
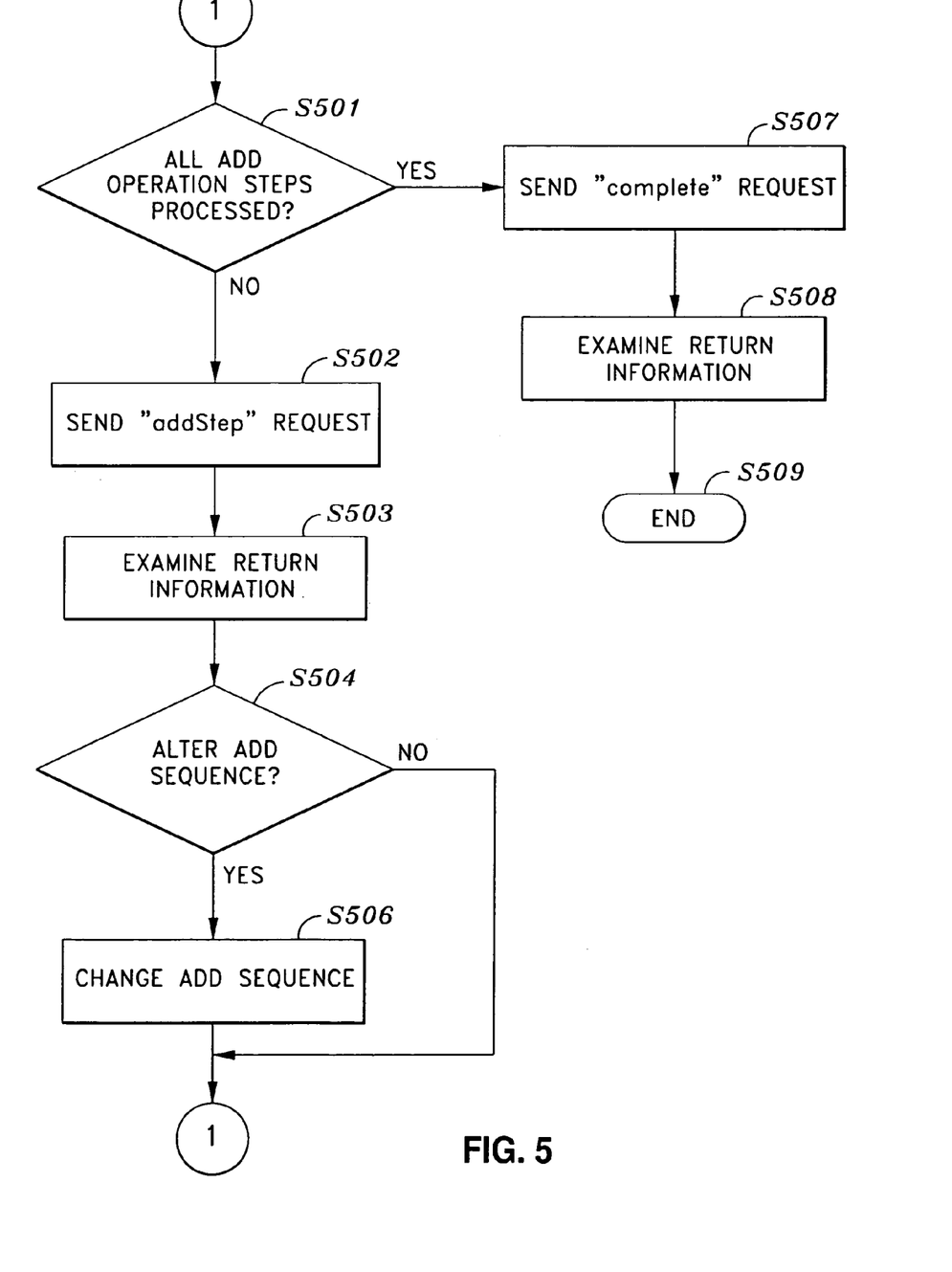
FIG. 5 illustrates a flow diagram of process steps to manage the creation of an overall color transformation according to the present invention.

FIG. 5 illustrates a flow diagram of process steps of application 402 to manage the creation of an overall color transformation according to the present invention. At step S501, a determination is made whether or not all of the add operations in the sequence of sequential add operations have been processed. If so, processing continues at step S507 to send a "complete" transformation request using complete 413, for example. Processing then continues at step S508 to examine return information 411 from the complete operation. Return information 411 is examined to determine whether the complete operation was successful (e.g., the overall transformation was successfully validated). In so doing, a determination might be made to create another overall transformation according to the present invention, for example.

If there are add operations remaining to be processed, processing continues at step S502 to send addStep 410. At step S503, return information 411 is examined, or tested, and at step S504 a determination is made whether or not the sequence of subsequent add operations should be altered based on the test. If not, processing continues at step S501 to process the remaining add operations in the add operation sequence. If it is determined at step S504 to alter the sequence of subsequent add operations, processing continues at step S506 to change the add sequence, and processing continues at step S501 to process the remaining add operation in the sequence, including the changes made in step S506.

Figure 6:
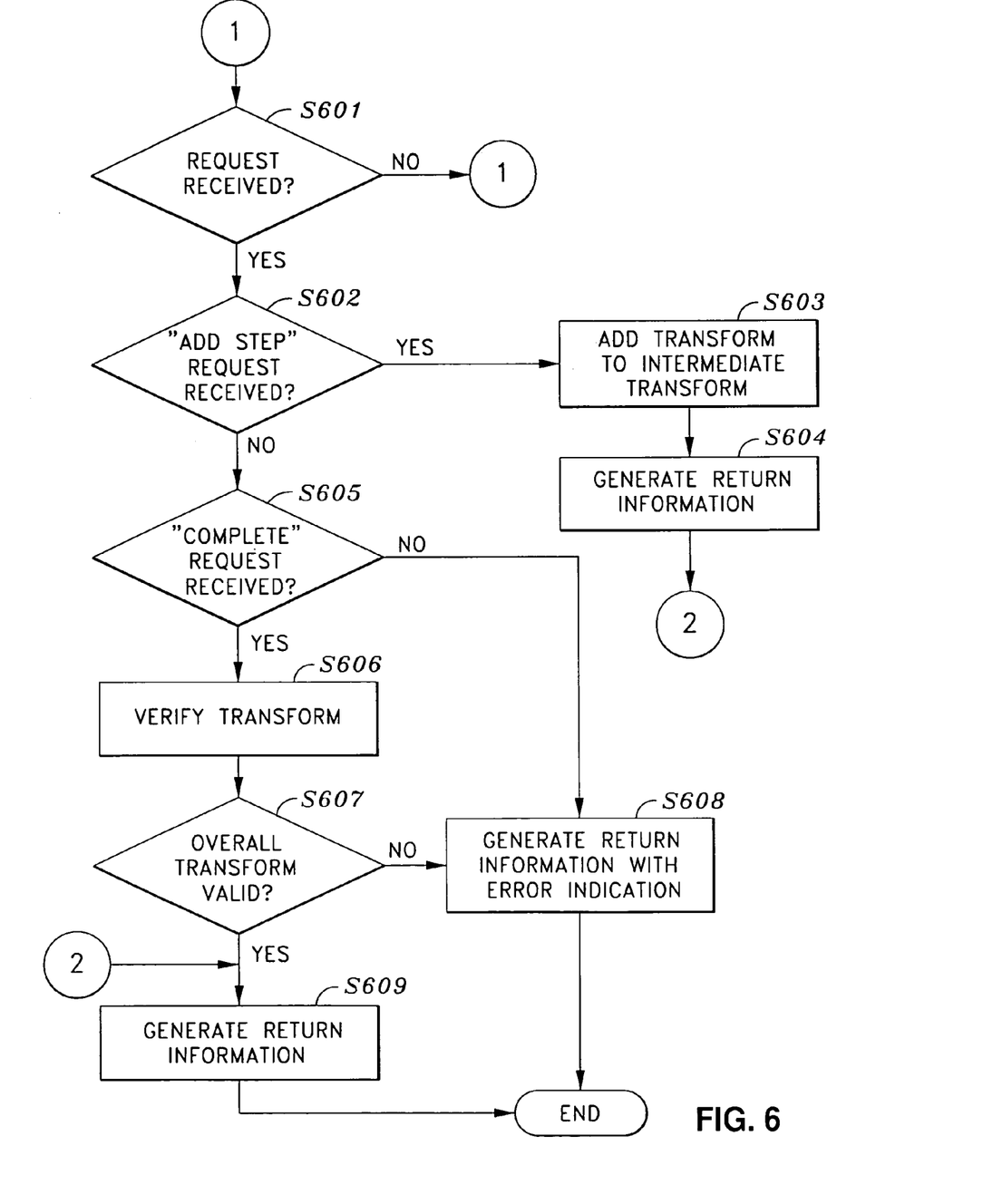
FIG. 6 illustrates a flow diagram of process steps to perform operation add and complete steps according to the present invention

FIG. 6 illustrates a flow diagram of process steps to perform operation add and complete steps according to the present invention.

At step S601, processing awaits a determination whether a request (e.g., a addStep 410 or complete 411) has been received. Once a request is received, processing continues based on whether the request is an addStep 410 request, or a complete 413 request. At step S602, if an addStep 410 is received, processing continues at step S603 to add execute an add operation to add an individual transformation step to intermediate transformation 407. At step S604, return information 411 is generated, and processing awaits receipt of another request at step S601.

If it is not an addStep 410 request, a determination is made whether the request is a complete 413 request at step S605. If so, processing continues at step S606 to verify the transform. A determination is made at step S607 whether the overall transform is valid. If not, processing continues at step S608 to generate return information 411 that includes an error, or warning, condition.

If it is determined, at step S607, that the overall transform is valid, processing continues at step S609 to generate return information 411, which includes an indication that the overall transform was completed successfully and is valid.

The following examples serve to illustrate some situations in which color transformation creation as described herein may be used. However, it should be apparent that application of the present invention is not limited to these exemplary situations.

Return information 411 may indicate a warning or error condition. To illustrate, consider a case in which source image 404 is captured using scanner 18 and is to be proofed on monitor 2 before it is printed using an offset press. The following is an example of an add operation sequence that might be used to create color transformation 412 to transform source image 404:

(1) addStep(scannerProfile)
(2) addStep(GMA1)
(3) addStep(pressProfile)
(4) addStep(GMA2)
(5) addStep(monitorProfile)
(6) Complete In each of the above steps, return information 411 might contain an error message indicating that the input (i.e., scannerprofile, GMA1, pressProfile, GMA2, or monitorprofile) was not found. In addition, if API 403 was unable to validate the profile data, a validation error can be returned in return information 411. For example, a validation error might occur in a case that one of the profiles is a MOP that did not contain enough measurement data, or the measurement data formed a matrix that could not be inverted. To further illustrate, addStep 410 operation of API 403 could return a syntax error in return information 411 indicating an invalid sequence, if add operation (3) was requested before add operation (2), for example.

To signal the completion of the add sequence, a complete operation (e.g., step (6) in the above example) is invoked in API 403, which causes API 403 to verify the overall transform. If, for some reason, the overall transform could not be created or could not otherwise be successfully verified, return information 411 can contain some indication of the error.

In the above example, API 403 identifies the condition (e.g., warning or error), and returns it as part of return information 411. However, in this next example, application 402, or a user via user interface 401, can determine a condition using return information 411, and decides to alter the add operation sequence. To illustrate, it is assumed that color transformation 412 is used to transform a digital image as source image 404 to output image 406, which is to be viewed on monitor 2. An example of an add operation sequence that might be used to create color transformation 412 is as follows:

(1) addStep(cameraProfile)
(2) addStep(indoorGMA)
(3) addStep(monitorProfile)
(4) Complete According to this sequence, application 402 executes API 403 to add a transformation step based on a device profile of the camera that captured the digital image. In this example, the camera profile is a measurement only profile (MOP) that contains measurement data and an indication that the measurement data was captured under indoor lighting conditions. From the add operation, the viewing condition information is provided by API 403 to application 402.

Typically, a digital image has metadata information that can be examined to determine the conditions in which the image was captured. Using the viewing condition information supplied by API 403 in return 411, application 402 examines the conditions in which the digital image was actually captured to determine whether they are compatible. For example, if the digital image was taken outdoors and the measurement data was captured under studio lighting conditions, the difference in the conditions might be result in an unacceptable output image 406. In such a case, application 402 might change add operation (2) above to substitute a gamut mapping algorithm (GMA) that is more likely to be able to compensate for the incompatibility in viewing conditions (e.g., change from an "indoor GMA" to a "specular highlighting GMA"). Alternatively, application 402 can provide the information via UI 401 to a user to make the user aware of the incompatibility, and then allow the user an opportunity to determine whether to proceed with the current add operation sequence, or to alter the sequence in some manner. A complete operation completes the overall transform.

A MOP that is added in an add operation contains measurement data, which is used to perform device characterization to generate, based on the MOP's measurement data, values or parameters of a mathematical model which generates colors in color appearance space from colors in device-dependent space.

For example, if a Gamma-Offset-Gain model is used, the gamma, offset and gain parameters are determined using the measurement data. Preferably, a characterization module is used to determine the parameters and performs the mathematical model using the parameters to transform the colors from device-independent color space to color appearance space.

In this example, as part of return information 411 an add operation can return information about the device characterization, which can be used to determine whether a change is needed in the sequence of add operations. An example of an add operation sequence that might be used to create color transformation 412 is as follows:

(1) addStep(cameraProfile)

Return information 411 from the addStep 410 that adds the camera profile includes a warning that a specific device characterization module was unavailable, and that a generic device characterization was used instead. As part of return information 411, gamut boundary descriptors generated from a generic device characterization module used with the camera profile are returned.

Application 402 and/or a user using user interface 401 examines the gamut boundary descriptors and determines that the gamut is too narrow. As a result the add operation sequence following the addStep(cameraProfile) is changed as follows:

(2) addStep(GMA2)
(3) addStep(idealProfile)

Regardless of whether return information 411 from addStep(cameraProfile), which adds a transformation based on the camera profile, includes the above warning, the transformation is completed as follows:

(n+1) addStep(GMA1)
(n+2) addStep(outputProfile)
(n+3) Complete wherein n represents the number of previous addSteps.

The add operation sequence is changed to add a transformation based on a different GMA (i.e., GMA2) and to add a transformation based on a profile for an ideal device, both of which are meant to enlarge the gamut, which was determined to be overly narrow as a result of the return information 411 from the camera profile add step. A complete operation completes processing of the overall transformation.

The following example illustrates an alteration to an add operation sequence that involves changing the information supplied to a subsequent add operation based on return information 411 from a previous add operation. For example, it is possible to preserve black generation and undercolor removal used by a device to generate source image 404 when producing output image 406. An example of an add operation sequence that might be used to create color transformation 412 is as follows:

(1) addStep(inputDeviceProfile)
(2) addStep(GMA)
(3) addStep(outputDeviceProfile, UCR/BG)
(4) Complete Return information 411 from the add operation adding the device profile for the input device identifies the input device's technique for performing black generation and undercolor removal. This information is provided with the add operation that adds the device profile for the output device. Following the add operation that adds the output device profile, the overall transformation is verified and processing is completed.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method of creating an overall color transformation from multiple ones of individual color transformation steps, the overall color transformation for use by a color management system to transform colors from one color space to another, the method comprising:
   requesting an add operation which adds a single one of the individual color transformation steps to an intermediate transformation created from preceding add operations;
   receiving returned information corresponding to the add operation and examining the returned information; and
   determining whether or not to alter the sequence of subsequent add operations based on the examination of the returned information,
   wherein the request of the add operation, the examination of the returned information and the determination are repeatedly performed until the creation of the overall color transformation is completed.

2. A method according to claim 1, wherein the add operation adds an individual transformation step to the intermediate transformation based on a device profile.

3. A method according to claim 2, wherein the profile comprises a measurement only profile.

4. A method according to claim 2, wherein the profile comprises an International Color Consortium (ICC) profile.

5. A method according to claim 2, wherein the returned value comprises information from the profile.

6. A method according to claim 2, wherein the returned value comprises an indication that the profile is invalid.

7. A method according to claim 1, wherein the add operation adds an individual transformation step to the intermediate transformation based on a gamut mapping algorithm.

8. A method according to claim 1, wherein the returned value warns of an incompatibility between the added individual transformation step and the intermediate transformation.

9. A method according to claim 1, further comprising:
   altering the added single one of the individual color transformation steps based on the examining step.

10. A method according to claim 1, further comprising:
    maintaining the sequence of subsequent add operations without alteration based on the examining step.

11. A method according to claim 1, wherein the returned value comprises a current status of the intermediate transform.

12. Computer-executable program code stored on a computer readable medium, said computer-executable program code for creating an overall color transformation from multiple ones of individual color transformation steps, the overall color transformation for use by a color management system to transform colors from one color space to another, said computer-executable program code executable to perform a method according to any of claims 1 to 8, 9, 10 or 11.

13. An apparatus for creating an overall color transformation from multiple ones of individual color transformation steps, the overall color transformation for use by a color management system to transform colors from one color space to another, said apparatus comprising means for performing the functions specified in any of claims 1 to 8, 9, 10 or 11.

* * * * *